US008844287B1

(12) United States Patent
Hardgrave

(10) Patent No.: US 8,844,287 B1
(45) Date of Patent: *Sep. 30, 2014

(54) THERMODYNAMIC AMPLIFIER CYCLE SYSTEM AND METHOD

(71) Applicant: William David Hardgrave, Carrollton, TX (US)

(72) Inventor: William David Hardgrave, Carrollton, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/849,975

(22) Filed: Mar. 25, 2013

Related U.S. Application Data

(63) Continuation of application No. 12/965,684, filed on Dec. 10, 2010, now Pat. No. 8,418,466.

(60) Provisional application No. 61/289,468, filed on Dec. 23, 2009.

(51) Int. Cl.
*F01K 7/00* (2006.01)
*F01K 7/32* (2006.01)
*F01K 23/02* (2006.01)
*F03G 7/00* (2006.01)

(52) U.S. Cl.
CPC . *F03G 7/00* (2013.01); *F01K 23/02* (2013.01); *F01K 7/32* (2013.01)
USPC ............ 60/645; 60/670; 60/653; 60/655; 60/641.2

(58) Field of Classification Search
USPC ............ 60/641.2–641.4, 645, 651, 653, 60/670–681, 655
See application file for complete search history.

(56) References Cited

U.S. PATENT DOCUMENTS

| 1,952,281 | A |   | 3/1934  | Ranque |
|-----------|---|---|---------|--------|
| 3,208,229 | A |   | 9/1965  | Fulton |
| 3,636,706 | A | * | 1/1972  | Minto ............................ 60/651 |
| 3,788,064 | A | * | 1/1974  | Hawkins ........................ 60/671 |
| 3,982,378 | A |   | 9/1976  | Sohre |
| 4,037,414 | A | * | 7/1977  | Nicodemus ..................... 60/670 |
| 4,121,425 | A | * | 10/1978 | Nicodemus ..................... 60/670 |
| 4,333,017 | A | * | 6/1982  | O'Connell ........................ 290/2 |
| 4,442,677 | A |   | 4/1984  | Kauffman |
| 4,506,524 | A |   | 3/1985  | Schlichtig |
| 4,542,625 | A |   | 9/1985  | Bronicki |
| 4,578,953 | A |   | 4/1986  | Krieger et al. |
| 4,646,524 | A | * | 3/1987  | Kawashima et al. ............... 62/5 |
| 4,738,111 | A |   | 4/1988  | Edwards |
| 4,942,736 | A |   | 7/1990  | Bronicki |
| 5,038,567 | A | * | 8/1991  | Mortiz ........................ 60/641.5 |

(Continued)

*Primary Examiner* — Thomas Denion
*Assistant Examiner* — Laert Dounis
(74) *Attorney, Agent, or Firm* — D. Scott Hemingway; Hemingway & Hansen, LLP

(57) ABSTRACT

The present invention is directed at the thermodynamic property amplification of a given thermal supply, provided by hydrocarbon combustion or in the preferred application heat provided by low-grade geothermal energy from the earth, for a vapor power cycle. The present invention achieves the desired objectives by segregating the compressible supercritical energy stream from the heat exchanger (boiler) into hot and cool fractions using a vortex tube, where the hot temperature is elevated above the heat exchanger temperature; and adding back heat (enthalpy) to the cool stream increasing the cool temperature to that of the geothermal heat exchanger. The heat-exchanger (boiler) supercritical gaseous mass flow segregated by a counterflow vortex tube (or bank of vortex tubes) forms hot and cool fractions where the hot temperature is raised above the heat-exchanger supply temperature, and heat (enthalpy) is added to the cool stream thereby increasing the cool temperature to that of the heat exchanger supply temperature.

45 Claims, 6 Drawing Sheets

(56) References Cited

U.S. PATENT DOCUMENTS

| | | |
|---|---|---|
| 5,327,728 A | 7/1994 | Tunkel |
| 5,561,982 A | 10/1996 | Tunkel et al. |
| 5,570,579 A | 11/1996 | Larjola |
| 5,816,048 A * | 10/1998 | Bronicki et al. .............. 60/641.5 |
| 6,101,813 A | 8/2000 | Sami et al. |
| 6,250,086 B1 * | 6/2001 | Cho et al. .............................. 62/5 |
| 6,516,617 B1 * | 2/2003 | Schwieger ..................... 60/679 |
| 6,594,997 B2 | 7/2003 | Romanelli |
| 6,981,377 B2 | 1/2006 | Vaynberg et al. |
| 7,225,621 B2 | 6/2007 | Zimron et al. |
| 7,260,934 B1 * | 8/2007 | Roberts ........................... 60/651 |
| 7,654,095 B2 | 2/2010 | Sullivan |
| 7,726,135 B2 | 6/2010 | Sullivan |
| 8,272,217 B2 * | 9/2012 | Lengert ........................... 60/649 |
| 2003/0213246 A1 | 11/2003 | Coll et al. |
| 2009/0241545 A1 * | 10/2009 | McCutchen .................... 60/670 |
| 2009/0320473 A1 | 12/2009 | Krieger et al. |
| 2010/0126172 A1 | 5/2010 | Sami |
| 2010/0186409 A1 * | 7/2010 | Hertel ............................. 60/653 |
| 2010/0192573 A1 * | 8/2010 | Hamilton et al. ............... 60/645 |

* cited by examiner

THERMODYNAMIC AMPLIFIER CYCLE SYSTEM AND METHOD

RELATED APPLICATION DATA

This application is related to Provisional Patent Application Ser. No. 61/289,468 filed on Dec. 23, 2009, and priority is claimed for this earlier filing under 35 U.S.C. §119(e), and this application is a Continuation Application of Utility patent application Ser. No. 12/965,684 filed on Dec. 10, 2010, and patent issued on Apr. 16, 2013, U.S. Pat. No. 8,418,466, and priority is claimed for this earlier filing under 35 U.S.C. §120. This Provisional Patent Application and prior Utility Patent Application are also incorporated by reference into this Continuation Patent Application.

FIELD OF THE INVENTION

The invention is directed to a thermodynamic amplification power cycle using vortex tube and heat exchanger technology in low temperature environments.

DESCRIPTION OF RELATED ART

Rising oil and electricity prices have spurred the use of the earth's Geothermal Energy ("earth heat"), to generate electrical power and to heat/cool buildings and homes. Geothermal Energy is the third largest source of renewable energy in the United States. Geothermal Energy can be generated both from drilling wells into the earth to produce electricity from heated water (hydrothermal heat), from heated $CO_2$ in the case of heat mining Hot Dry Rock (HDR), and from the high temperatures of the earth itself exhibited closer to the surface.

The map at FIG. 1 shows areas of geothermal hydrothermal resources for Texas. In general, the light shaded areas represent the known potential of lower-grade hydrothermal resource hydrothermal uses such as space heating, desalinization and resort spas, but marginal for electrical power generation. The darker shaded areas in the coastal areas shows the known potential for geopressure uses such as heating, enhanced oil recovery and electrical power generation. The dark shaded area in East Texas shows the known hot dry rock potential with temperatures required for most geothermal electrical power generation.

Geothermal energy extraction is currently limited to the highest grade "hydrothermal" resources with reservoir permeability and fluid reserves sufficiently large to sustain production at commercial rates. The heat stored in the earth beneath Texas at a depth accessible with today's drilling technology is truly vast. However, the fraction of this lower-grade resource base that can be economically recovered is dependent on improving the technology to extract heat, map, penetrate, fracture, and maintain productive Engineered Geothermal System (EGS) reservoirs—and on improving our understanding of reservoir behavior under long-term energy extraction. Shallow wells at depths of 1,500, and less than 4,000 m are representative of today's hydrothermal practice.

Geothermal wells range in depth from 1,500 m (4,920 ft) to 10,000 m (32,800 ft) and are grouped into three categories: shallow wells (1,500-3,000 m), midrange wells (4,000-5,000 m), and deep wells (6,000-10,000 m) (MIT 2006). Drilling deep directionally oriented wells to specific targets. Emerging technologies, which have yet to be demonstrated in geothermal applications and are still going through development and commercialization, may significantly reduce the cost of these wells, especially those at 4,000 m and deeper.

The largest heat resource in Texas, by far, is contained in hot dry rocks of low natural permeability. Texas has many areas with Hot Dry Rock (HDR) that exhibit elevated temperatures that can be heat mined using supercritical-fluid $CO_2$ as the primary heat extraction fluid for commercial development of its geothermal resources. Development of Texas' lower-grade EGS resources should be a primary goal for commercial feasibility, but is currently not feasible using current technology or systems.

A commercial-sized reservoir to generate electrical power or cogenerate electrical power using a new enthalpy expansion system will result in more power output. This is the difficulty of stimulating natural or generating artificial fractures in a sufficiently large volume of hot rock, of order ¼ mile$^3$ (1 km$^3$); achieving and maintaining fluid circulation at commercial rates of up to 55 lb/sec and avoiding (a) insufficient permeability of fracture network, and (b) short-circuiting pathways leading to premature thermal breakthrough at production wells.

Today, the classic EGS improvement would require improving the natural permeability and heat conductivity of the HDR. Rocks are naturally porous by virtue of minute fractures and pore spaces between mineral grains. When some of this porosity is interconnected so that fluids ($CO_2$, water, steam, natural gas, crude oil) can flow through the rock, such interconnected porosity is called permeability. Rock permeability extends in a continuum over several orders of magnitude, from rocks that are highly permeable and whose contained fluids can be produced by merely drilling wells (e.g. oil and gas wells, water wells, hydrothermal systems), to those that are almost completely impermeable (e.g., tight gas sands, hot dry rock). Extraction of heat at commercial rates from well-defined regions of hot fractured rock without excessive thermal drawdown is a challenge. Long-term commercial operability, up to 55 lb/sec. flow rate, for heat production from EGS reservoirs for sustained periods of time is required. This level of operability is not attainable using current technology or systems.

There are vast reserves of carbon dioxide, $CO_2$ in the West Texas Overthrust area, the same area that shows a promising high geothermal gradient. The abundance of $CO_2$ in Texas makes $CO_2$ the reasonable heat-extraction fluid choice for the state's heat mining. Measurable improvements to these important components of EGS technology involves the use of supercritical $CO_2$ as a fluid for heat extraction within an EGS reservoir (Brown, 2000). Recently, Pruess and Azaroual (2006) estimated reservoir performance using supercritical $CO_2$ in place of water. A fully supported federal R&D program and the anticipated market price increases for electric power will drive the demand for geothermal heat-extraction efficiency as well as the ability to store and sequester $CO_2$ within a confined EGS reservoir for carbon management.

What is needed is a highly efficient Rankine Vapor Power Cycle (Main Cycle) for use in a Binary Vapor Cycle. The Texas map also shows five and possibly six (6) major regions within Texas that have a strong potential for geothermal electrical power production. These include 1) the East Texas region, 2) the Gulf Coast, 3) the Delaware-Val Verde Basin region, 4) the Trans-Pecos region, 5) the Anadarko Basin where it enters the Texas Panhandle, and 6) the Maverick Basin along the South Texas-Mexico border. These regions are based upon the existence of oil and gas wells that have registered temperatures above 212° F. In Pecos and Terrell Counties, temperatures of (150° C. to 265° C.) nearly 300° F. are found in the midrange 18,000 ft deep wells in the Delaware-Val Verde Basin Overthrust. The Delaware Basin thermal conductivity is measured at 2.6 W/mK. These wells contain at least 80% $CO_2$ and 20% natural gas and can be considered natural $CO_2$-bearing geothermal systems. This region could supply the state with an abundance of $CO_2$ for heat mining as well as provide heat for electrical power generation if the state of thermodynamic technology was improved. The ability to efficiently conduce "heat mining" and economically produce a positive work emerging in most of these low-grade temperature regions is not feasible using current technology or systems.

There are known thermodynamic techniques for converting heat energy into mechanical, electrical, or some other type of energy, but none of these known techniques satisfy the needs in a low temperature environment. The basic principle by which such techniques function is to provide a large temperature differential across a thermodynamic engine and to convert the heat represented by that temperature differential into a different form of extractable energy. Typically, the heat differential is provided by hydrocarbon combustion, although in this application the preferred heat is provided by low-grade geothermal energy from the earth. Using hydrocarbon combustion systems, power is typically generated with an efficiency of about 30%.

Conversion of heat into mechanical energy is typically achieved using an engine like a Stirling engine, which implements a Carnot cycle to convert the thermal energy. The mechanical energy may subsequently be converted to electrical energy using any of a variety of known electromechanical systems.

An Organic Rankine Cycle (ORC) uses a working fluid in a closed cycle to gather heat from a heating source or a hot geothermal reservoir the heat evaporates the working fluid generating a hot gaseous stream that expands through a turbine to generate extractable power. The expanded stream is condensed in a condenser by rejecting the heat to the surrounding atmosphere at atmospheric temperatures. The working fluid in an ORC follows a closed loop and is re-used constantly. The efficiency of an ORC in a low-temperature heat recovery application is very sensitive to the temperatures of the hot and cold reservoirs between which they operate. Thermal efficiency is approximately 10%.

In many cases, these operating temperatures change significantly during the lifetime of an ORC plant. Geothermal plants, for example, may be designed for a particular temperature of low-grade geothermal heating fluid from the earth, but lose efficiency as the ground fluid cools over time, thereby shifting the plant operating temperature away from its design point. Air-cooled ORC plants that use a particular temperature of geothermal heating fluid from the earth as their heating fluid still deviate from their design operating conditions as the outside air temperature changes with the seasons or even between morning and evening. What is needed is a system that can operate at high pressure and restore the design operating temperature by amplifying the supply heat (enthalpy) and temperature, thereby extending the life of the plant for a particular location. And, what is needed is a system that lowers the condensing temperature, expanding the working temperature range for expansion.

Amplifying the gathered heat (enthalpy) and temperature imparted by a low-temperature heating source at an elevated pressure will become important to the US on the path to sustainable energy. There is a present and significant need for a power generation system that can operate with a particular lower-grade geothermal temperature source. Known patented systems are shown in the following references.

U.S. Pat. No. 3,208,229 titled "Vortex Tube" by Fulton relates to the design and construction of vortex tubes capable of emitting colder and hotter streams of gas, operating more efficiently, being more compact and more cheaply manufactured. This patent does not anticipate the useful application of this device for vapor power systems. This patent further does not anticipate any non-thermal means to produce segregated energy streams, nor their direct use in a system concurrently.

U.S. Pat. No. 5,327,728 by Tunkel is a method for the design of a vortex tube for energy separation, the vortex tube having a long tube, a diaphragm closing one end of the tube having a hole in the center, one or more tangential nozzles piercing the tube just inside the diaphragm, and a throttling valve at the far end of the tube. Although there is no universally accepted theoretical explanation of the energy separation phenomenon or the vortex effect, Tunkel is recognized as an authority on the subject.

U.S. Pat. No. 5,561,982 titled "Method for energy separation and utilization in a vortex tube which operates with pressure not exceeding atmospheric pressure" by Tunkel, et al. utilizes a vacuum pump to achieve the pressurized solution to discharge a cool stream connected though the heat exchanger provided to utilize as a cool duty and produce a hot stream at the far end of the tube for a hot duty.

SUMMARY OF THE INVENTION

This present invention supports the generation of electrical power from a specific heat source by employing into service a vapor power cycle, and more particularly, the use of an Organic Rankine Cycle utilizing at least one low evaporation temperature refrigerant as a working fluid. A heat source communicates with the ORC thermally, evaporating the high pressure, working fluid, creating supercritical vapor flow from the evaporator heat exchanger. The supercritical flow is segregated by a counterflow vortex tube (or bank of vortex tubes) forming hot and cool fractions at a lower pressure. The hot fraction temperature is raised above the evaporator heat exchanger temperature. The cool fraction temperature falls below the evaporator heat exchanger temperature and is returned to the evaporator heat exchanger (or separate heat-exchanger communicating with the heat source) for re-heating. The two fractions are united to form a supercritical flow that is at a higher temperature than the source.

The invention extends the usable range of supercritical vapor thermodynamic properties surpassing the well known ORC isotropic limit preventing condensate from forming in the turbine's last stage. The ORC system's high pressure is elevated above normal ORC limits to increase efficiency at the discretion of the system operator. This is especially advantageous when using low-grade temperature heat sources or compensating for atmospheric fluctuations.

The invention is directed at the amplification of the thermodynamic properties of a given thermal supply source provided by a means such as hydrocarbon combustion (as found in a boiler, heater or high temperature exhaust gases), electrical means or the preferred application—heat provided by low-grade geothermal energy from the earth. The heat source transfers its thermal supply through the use of an evaporator heat-exchanger to the ORC working fluid. The present invention can restore the design operating temperature by amplifying the degraded supply heat (enthalpy) and pressure, thereby extending the life of a plant for a particular location. The restored ORC system will operate at a higher pressure than the original design.

The present invention provides for use of the Binary Vapor Cycle whereas the main cycle is a closed ORC. The topper cycle employs at least one counterflow vortex tube to increase the temperature and total energy requirements to achieve power production. For a given temperature, the system pressure can be increased surpassing the normal limits and the compressible supercritical energy supply stream is segregated into hot and cool fractions, yielding opportunities to use the fractions separately to enhance the performance of the main ORC cycle. The hot fraction can be used to enhance the evaporation process while the cool fraction can be used to lower the condenser temperature.

For any given source temperature above the working fluid's critical temperature (supercritical vapor state), the invention enables an ORC to use the given temperature at a high pressure to generate electrical power efficiently. For refrigerant R410A, the critical temperature and pressure are 161.83° F. and 714.50 psia respectfully. The minimum temperature for refrigerant R410A as the working fluid is 161.83° F. with the possibility of using 160.44° F. The operating pressure choice could be set as high as 4,150 psia, the Joule-Thomson inversion pressure, but is more efficient set at 1,400 psia.

DETAILED DESCRIPTION OF THE PREFERRED EMBODIMENT

Figure 1:
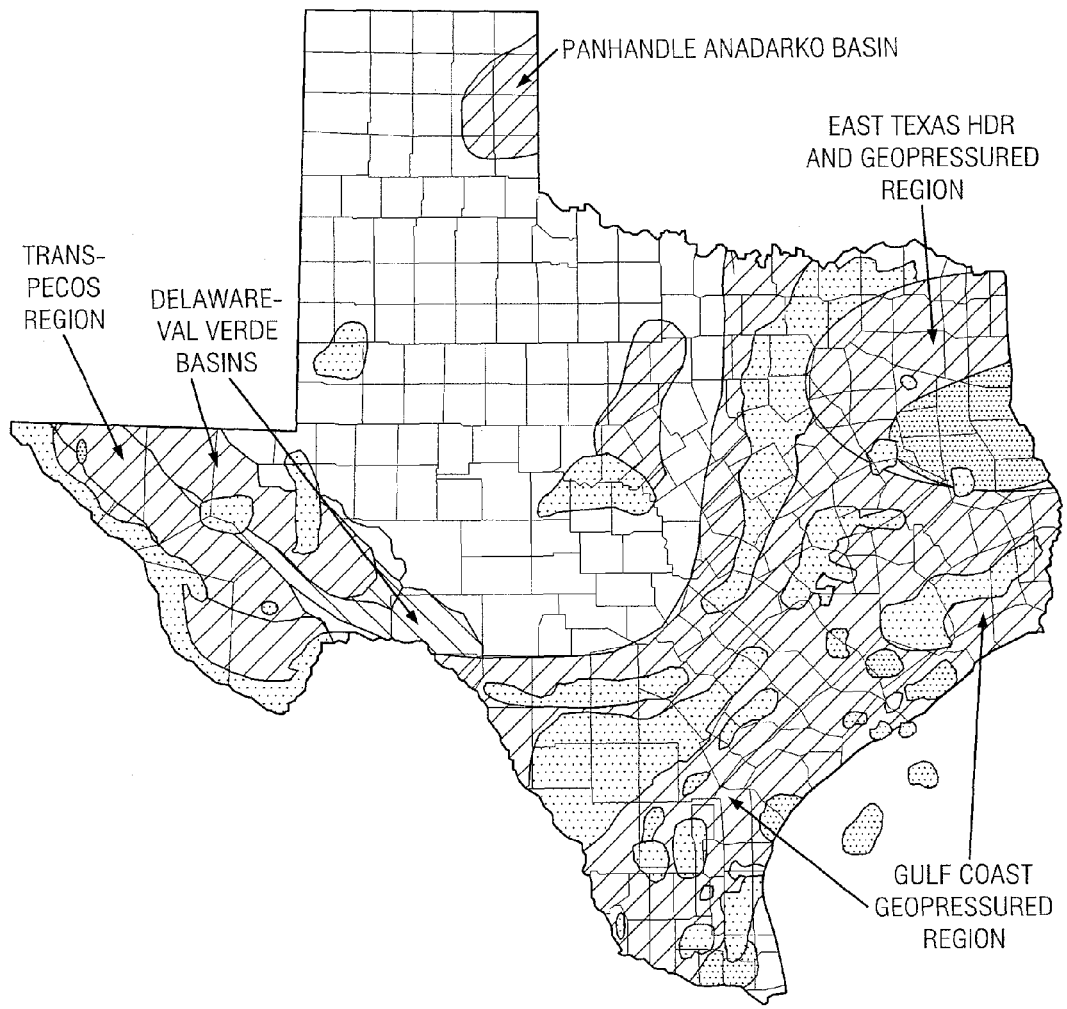
FIG. 1 is a map of the State of Texas shown various geothermal areas and locations.

A closed Organic Rankine Cycle ("ORC") is a system for delivering extractable power from a heat source where the liquid is compressed by the pump and delivered to the geothermal evaporator heat-exchanger, which is also referred to herein as a heat exchanger. The liquid is a working fluid. The evaporator heat-exchanger transfers external heat to the ORC working fluid, evaporates the fluid and delivers high temperature and pressure (supercritical energy) vapor to the power producing turbine for energy extraction. The use of the term vapor power cycle, thus is broadly applied as the transport of thermal energy from one enthalpy/entropy state to another. Thus, the utilization of vapor power cycles is not restricted to power generation (e.g. electrical or mechanical energy), but also for the intrinsic movement of thermal energy in virtually any thermodynamic cycle including means to convert such thermal energy for generation of heating or cooling extraction.

The present invention achieves the desired objectives by segregating the compressible supercritical energy stream from the heat evaporator exchanger or a boiler into hot and cool fractions, where the hot temperature is elevated above the heat exchanger temperature; and reheating the cool stream increasing the cool temperature to that of the evaporator heat exchanger. The present invention increases the temperature and total energy requirements to achieve power production by segregating the compressible supercritical energy supply stream into hot and cool fractions yields opportunities to use the fractions separately to enhance the performance of a vapor power cycle. The hot fraction can be used to enhance the evaporation process while the cool fraction can be used to lower the condenser temperature. The term fluid stream is used in this application to mean vapor, liquid and gaseous states.

The present invention is also directed at the thermodynamic property amplification of a given thermal supply, provided by hydrocarbon combustion or in the preferred application heat provided by low-grade geothermal energy from the earth, for a vapor power cycle. The heat-exchanger (boiler) supercritical gaseous mass flow segregated by a counterflow vortex tube (or bank of vortex tubes) forms hot and cool fractions where the hot temperature is raised above the heat-exchanger supply temperature, and heat (enthalpy) is added to the cool stream thereby increasing the cool temperature to that of the heat exchanger supply temperature. The present can restore the design operating temperature by amplifying the supply heat (enthalpy) and temperature at a loss of pressure, thereby extending the life of the plant for a particular location, and the present invention lowers the condensing temperature, expanding the working temperature range for expansion.

The vortex phenomenon, energy segregation in rotating flow, occurs only with a compressible fluid. There is no energy segregation in any rotating liquid flow (Tunkel). Returning the cool fraction to the evaporator heat-exchanger, or a separate heat-exchanger, for heating, the heated cool fraction is combined with the hot fraction before continuing to the power producing turbine for energy extraction. The net effect is the addition of heat from heating at a higher system pressure will increase the stream temperature above the heat-exchanger supply temperature for a given thermal input. A closed ORC is simply a system for delivering extractable power from a heat source. Thus, liquid is compressed by the pump and delivered to the evaporator heat-exchanger.

The evaporator heat-exchanger transfers external heat to the ORC working fluid, evaporates the fluid and delivers high temperature and pressure (supercritical energy) vapor to the power producing turbine for extraction. Throughout the application, the invention will be referred to as a Thermodynamic Amplifier with the understanding that the designation of Organic Rankine Cycle, Brayton Cycle, Carnot Cycle, and Kalina Cycle could be substituted without changing the operation of the device.

To better understand some terms used in the application, a Rankine cycle is utilized to produce power. This process is complex and requires multiple steam turbines, feed water heaters, steam drums, pumps, etc. Typically, waste heat from gas turbines or other, similar, high quality heat sources are recovered using steam at multiple temperatures and pressures. Multiple operating levels are required because the temperature-enthalpy profile is not linear. The Rankine cycle involves isothermal (constant temperature) boiling as the working fluid, i.e., water, is converted from a liquid to a vapor state.

An Organic Rankine Cycle (ORC) is similar to the classic Rankine cycle, but an Organic Rankine cycle utilizes a low temperature working fluid in a closed cycle such as refrigerant R125 or R410A in place of steam in the classic cycle. The system remains complex and is highly inefficient at low operating temperature differentials.

The working fluid in an ORC follows a closed loop and is re-used constantly. The efficiency of an ORC in a low-temperature heat recovery application is very sensitive to the temperature differential range within which it operates. In many cases, these temperatures change significantly during the lifetime of an ORC plant. Geothermal plants, for example, may be designed for a particular temperature of low-grade geothermal heating fluid from the earth, but lose efficiency as the ground fluid cools over time, thereby shifting the plant operating temperature away from its design point. Air-cooled ORC plants that use a particular temperature of geothermal heating fluid from the earth as their heating fluid still deviate from their design operating conditions as the outside air temperature changes with the seasons or even between morning and evening.

The present invention is directed at the thermodynamic property amplification of a given heat source, provided by hydrocarbon combustion or in the preferred application heat provided by low-grade geothermal energy from the earth, for an ORC. The supercritical working vapor from the first heat-exchanger is segregated by a counter-flow vortex tube (or bank of vortex tubes) forming hot and cool fractions where the hot temperature is raised above the first heat-exchanger source fluid first temperature. The vortex phenomenon, energy segregation in rotating flow, occurs only with a compressible fluid. Normally, there is very little (no) energy segregation in any rotating liquid flow (Tunkel).

A heat exchanger is any device that affects the transfer of thermal energy from one fluid to another. This invention uses recuperation type heat exchangers, where the fluids are separated by a wall preventing the pressure and fluids from interacting. In this case, the thermal communication is conductive and convective heat transfer, and sometimes radiation. Common heat exchanger configurations include the flat-plate, shell-and-tube, and crossflow types. The heat exchanger of choice for the Evaporator is the shell-and-tube design with several tubes, 4 to 5 passes, and baffles. If the fluids both flow in the same direction, it is referred to as a parallel-flow type; if they flow in opposite directions, a counterflow type.

Evaporators are heat exchangers used to transfer heat source energy from a heat source body to a colder body or to the surroundings by means of heat transfer. Energy is transferred from the high pressure hot gases or liquids produced from a geothermal well and transferred to the Heat Exchanger supplied with a refrigerant.

Shell-and-tube heat exchangers utilize a flow passage into which a refrigerant enters and from which the refrigerant exits at a different temperature. The velocity does not normally change, the pressure drop through the passage is usually neglected, and the potential energy change is assumed zero. The energy equation for the heat source then results in $$\dot{Q}_o = (h_{out} - h_{in}) \dot{m}_o$$

since no work occurs in the heat exchanger.

Energy may be exchanged between two moving fluids. For the combined unit, which is assumed to be insulated, the energy equation, as applied to the combined unit, would be $$0 = \dot{m}_o (h_{out} - h_{in}) + \dot{m}_r (h_1 - h_8)$$

The energy that leaves the geothermal fluid o is transferred to refrigerant fluid r by means of the heat transfer $\dot{Q}$. For the refrigerant and well fluids respectfully, we have relationships $$\dot{Q}_r = \dot{m}_r (h_1 - h_8); -\dot{Q}_o = \dot{m}_o (h_{out} - h_{in}); \dot{Q}_o = \dot{Q}_r$$

$$\dot{m}_o (h_{one} - h_{out}) = \dot{m}_r (h_1 - h_8), \text{ or}$$

$$\dot{m}_o C_p (T_{in} - T_{out}) = \dot{m}_r (h_1 - h_8)$$

A counter-flow vortex tube with a diaphragm closing one end of the tube body and a small hole in the center of the diaphragm, at least one tangential nozzle piercing the tube body just inside the diaphragm, and an obstruction and throttle valve at the far end of the tube body.

Figure 2:
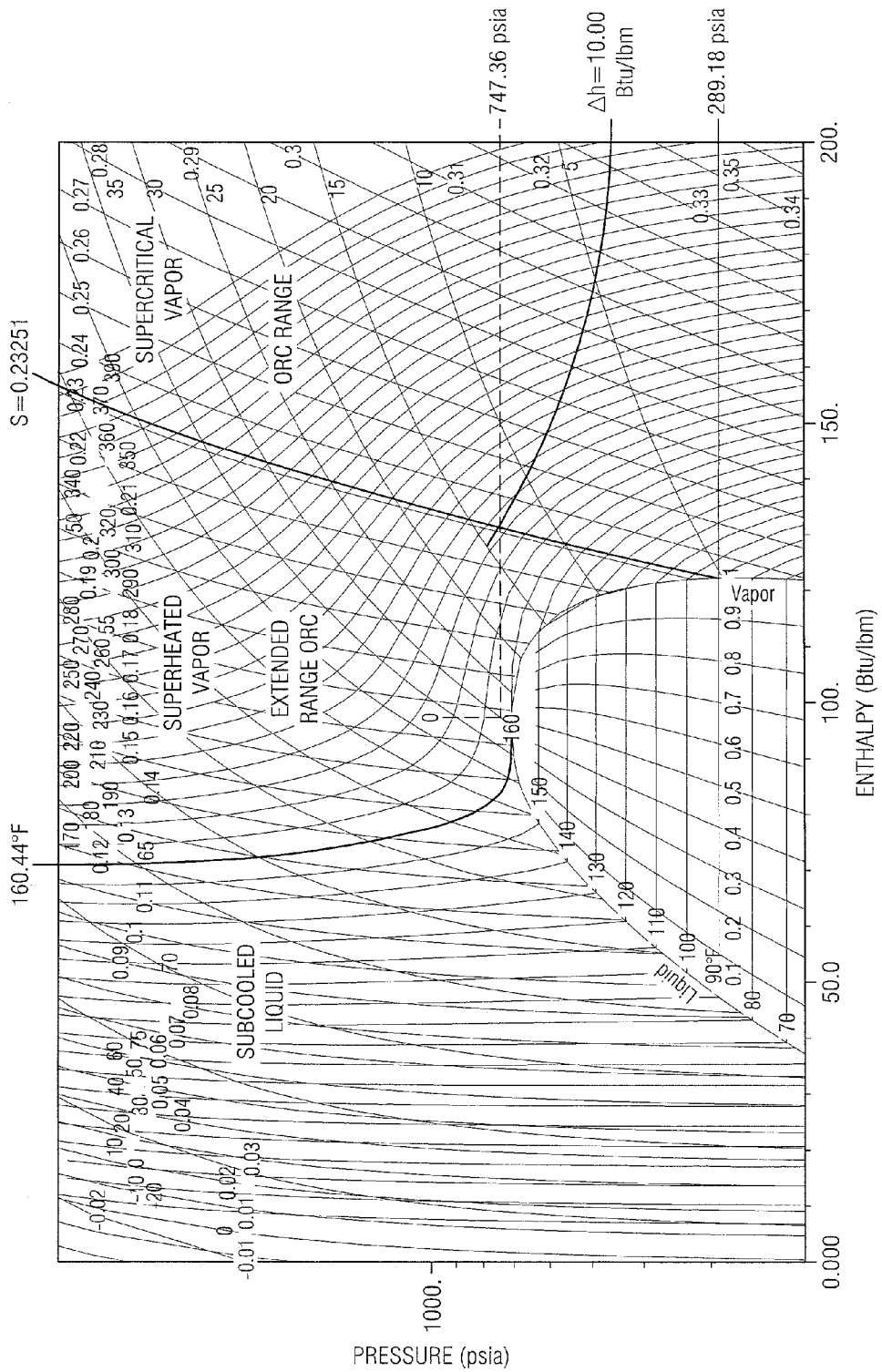
FIG. 2 is a Pressure versus Enthalpy (Ph) state diagram depicting the extended range gained by adding a thermodynamic amplifier system.

The addition of the vortex tube enables the use of the Extended Range ORC states that cannot be used by the common ORC at a much higher pressures of choice in FIG. 2. Lower temperatures can be used at efficiencies only seen in high temperature ORC applications. This table lists some R410A examples of lower temperatures used in ideal applications to demonstrate the importance of the Extended Range ORC. Enthalpy and efficiency values are representative of the expected improvements exhibited by the Extended Range ORC.

| Source Temperature (° F.) | ERORC Pressure (psia) | Intermediate Pressure (psia) | Turbine Δh (Btu/lbm) | Thermal Efficiency (%) |
|---|---|---|---|---|
| 300 | 1000 | 776.87 | 16.28 | 11.96 |
| 300 | 3630 | 1814.2 | 20.40 | 16.48 |
| 300 | 3400 | 1700 | 20.66 | 17.37 |
| 200 | 1200 | 747.36 | 11.51 | 16.96 |
| 200 | 1400 | 747.36 | 10.97 | 17.36 |
| 200 | 1400 | 716.00 | 10.71 | 16.78 |
| 200 | 1400 | 750.00 | 10.99 | 17.40 |
| 200 | 1400 | 900.00 | 11.65 | 18.87 |
| 200 | 1400 | 616.95 | 10.44 | 16.18 |
| 185.10 | 1000 | 747.36 | 10.00 | 10.30 |
| 185.10 | 1400 | 822.00 | 10.32 | 19.60 |
| 185.10 | 1800 | 715.31 | 9.88 | 17.27 |
| 160.44 | 1400 | 715.31 | 6.91 | 15.39 |
| 160.44 | 1400 | 682.00 | 8.31 | 21.13 |

This table lists some R410A examples of the ORC at maximum evaporator pressures and typical efficiencies expected. Note that the efficiency for ERORC 300° F. and 1000 psia is 11.96 compared to 17.2 for ORC. This is typical when an ERORC pressure is chosen below the maximum ORC pressure.

| Source Temperature (° F.) | Maximum ORC Pressure (psia) | Turbine Δh (Btu/lbm) | Thermal Efficiency (%) |
|---|---|---|---|
| 300 | 1814.2 | 19.82 | 17.2 |
| 200 | 776.87 | 10.41 | 10.75 |
| 195.34 | 747.36 | 10.00 | 10.4 |
| 185.10 | 686.00 | 9.09 | 9.6 |
| 160.44 | 555.87 | 6.87 | 7.5 |

The well known ORC pressure range for particular temperatures are as follows:
- 300° F. (509.07→1814.2 psia);
- 250° F. (553.29→1174.7 psia);
- 200° F. (680→776.87 psia); and
- 195.34° F. (747.36→747.36 psia).

Most vapor turbines operate with exhaust qualities of 0.90 or more. For this analysis, the exhaust quality 1.00 (saturated vapor) at 90° F. is chosen to set the minimum isotropic (constant entropy=0.23251 Btu/lbm-° R) limit. The lifetime of a turbine is a function of the quality of the vapor impinging on the blades. If the moisture content is high, erosion can be quite severe, therefore, fully saturated vapor is desirable. Also, a condensing system (ORC system) rejects heat at a particular condensing temperature and pressure, condensation could occur at a lower temperature without affecting the energy addition in the boiler with a favorable change in enthalpy in the turbine. The lower limit is determined by an acceptable enthalpy change across the turbine. For this analysis, the $\Delta h$ is chosen to be 10.00 Btu/lbm.

With the addition of a vortex tube in conjunction with the cold fraction reheating cycle shown in the present invention, the minimum system temperature is 160.44° F. The minimum operating temperature is extended from 195.34° F. at 747.36 psia to 160.44° F. at 1,400 psia. The ORC cannot exceed 747.36 psia and maintain the chosen Ah of 10.00 Btu/lbm, whereas, the incorporation of the vortex tube extends the pressure limit to 4150 psia, which is a point where the Joule-Thomson inversion occurs.

High pressures are necessary to increase the ORC cycle efficiency. The inclusion of a vortex tube with the addition of the cold fraction reheating cycle represented in the present invention makes it possible to use higher evaporator pressures for a given temperature. This generally means a reduction in the quality of the flow in the turbine. For this reason, the reheat of the cold fraction is employed in this modification of the Rankine cycle to improve the quality of the flow. The ORC design limits the evaporator pressure as well as the cycle efficiency.

To provide a more complete analysis of the operation of the invention, reference is made to the Pressure versus Enthalpy (Ph) state diagram in FIG. 2. The state diagram represents theoretical curves not attainable with a practical, actual working system. The curves, however, are instructive to provide an analysis of system operation. It is to be understood that the temperatures and pressures of the diagrams are exemplary, to provide the reader with a typical set of pressure and temperature circumstances.

The present invention simplifies the process while having the capability to recover more heat to economically recover heat from a much lower grade heat source to amplify the recovered heat and to convert the amplified heat represented by its temperature differential into a different form of extractable energy. In general, the present invention is a system and method for improving the efficiencies of various power generation systems and for utilizing waste heat sources to improve operating efficiencies of various power and industrial systems. The invention extends the ORC lower temperature range enabling the use of lower grade heat sources while holding or improving its performance level. The addition of superheating would permit the operation with a higher turbine-inlet enthalpy. However, additional energy would have to be added as heat, which would tend to offset the power gain.

The present invention is an enhancement of the Rankine cycle that extends the temperature differential range potential of the cycle and allows higher efficiencies than are possible in the Rankine cycle. The methods and systems of the present invention simplify the complex process while having the capability to recover more heat using a reheat cycle and to recover heat from a low quality heat source by amplifying its temperature-enthalpy. The invention is directed generally to low temperature power generation, and more specifically to the use of segregated energy streams to achieve a high efficiency vapor power Organic Rankine Cycle.

The present invention, Extended Range Organic Rankine (EROR) cycle, utilizes a low evaporation temperature working fluid to recover heat from a lower quality heat source; extends the temperature differential range by amplifying the recovered heat (enthalpy) and temperature through the use of a vortex tube and reheat cycle; supplies an 1) evaporator heat exchanger that is adapted to thermally communicate with the lower quality heat source in order to evaporate the low evaporation temperature refrigerant; a 2) vortex tube for energy separation of refrigerant vapor, adapted to reheat the lower energy fraction; supplies a 3) power producing turbine adapted to receive the amplified heat energy to generate extractable power; supplies a 4) condenser heat exchanger that is adapted to receive the turbine exhaust vapor, wherein, the temperature of the exhaust vapor is reduced via heat transfer rejecting the waste heat to the surrounding atmosphere at atmospheric temperatures; wherein, the working vapor is converted to a saturated liquid and returned to the first heat exchanger by a 5) pumping means for further cycling.

Figure 3:
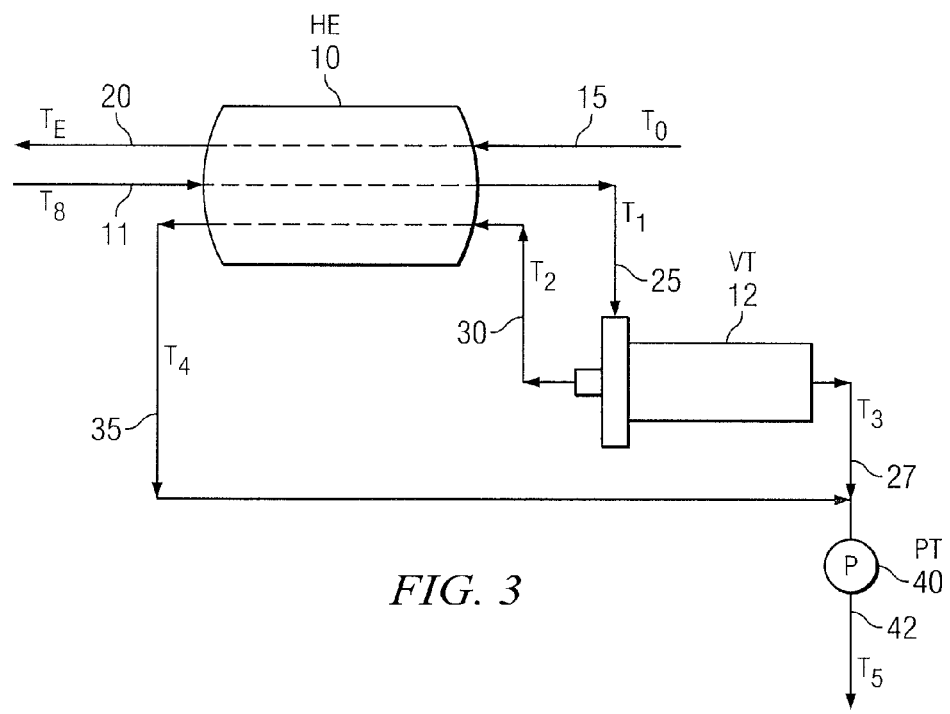
FIG. 3 is a schematic design and flow diagram of the invention using a thermodynamic amplifier depicted as a counterflow vortex tube and heat exchanger connected to amplify the thermal output for a given thermal input.

Referring now more particularly to the accompanying drawings and particular to the schematic design and flow diagram of FIG. 3 which illustrates one embodiment of the invention, a Thermodynamic Amplifier comprised of a heat-exchanger and counterflow vortex tube with a diaphragm closing one end of the tube body and a small hole in the center of the diaphragm, at least one tangential nozzle piercing the tube body just inside the diaphragm, and an obstruction and throttle valve at the far end of the tube body.

As shown in FIG. 3, the heat exchanger HE 10 receives a fluid flow $T_8$ and heats the fluid into a supercritical vapor, $T_1$ 25. The vapor $T_1$ 25 is provided through tangential nozzle(s) to the vortex tube VT 12, which discharges a fraction of cool expanded vapor, $T_2$ 30, (also called the cool fraction) through a small hole in the diaphragm back to a return stream of heat exchanger HE 10. At the vortex tube VT 12, a fraction of intensely hot vapor, $T_3$ 27, created by the corollas force compression through the throttle valve in the vortex tube VT 12 is fed into stream $T_5$ 42, which may be circulated through a pump 40. For this embodiment and the other embodiments disclosed herein, a compressor unit can be used with or instead of the pump 40 or similar pump components.

The cool fraction stream, $T_2$ 30, is routed to the first heat-exchanger HE 10 for reheating, and exits the heat exchanger HE 10 at an increased temperature at stream, $T_4$ 35, to the level of the first heat-exchanger source temperature. This stream $T_4$ 35 is combined and mixed with the intensely hot fraction, $T_3$ 27, (superheated flow) into $T_5$ 42. The effect is to thermally communicate with the source and increase the cool fraction temperature, $T_4$ 35, at which energy is added externally, thereby increasing the energy-conversion efficiency with a back flow stream through the heat exchanger HE 10.

The function of the counter-flow vortex tube in the present invention is to receive the evaporated heat-exchanger flow supply of supercritical vapor, $T_1$ 25, through tangential nozzle(s) and to discharge a fraction of cool expanded vapor, $T_2$ 30, through a small hole in the diaphragm, and a fraction of intensely hot vapor, $T_3$ 27, created by the corollas force compression through the throttle valve. It is important to note that vapor does not respond as an ideal gas; therefore, actual data should be used to predict performance of the vortex tube. By separating the hot and cool fractions causing a reduction in the pressure, the cool fraction, $T_2$ 30, is routed to the first heat-exchanger for reheating, to step up the cool fraction temperature, $T_4$ 35, to the level of the first heat-exchanger source temperature and combine with the intensely hot fraction, $T_3$ 27 (superheated flow) both to be mixed, $T_5$ 42.

The reheated cool fraction is routed to the power producing turbine-inlet thereby amplifying the enthalpy input from $h_1$ to $H_5$, extending and maintaining the enthalpy-spread from $h_5$ to $h_6$, and temperature, $T_5$, across the power producing turbine yielding a greater power extraction. $T_o$ 15 is the source fluid flow provided to the heat exchanger HE 10, and $T_e$ 20 is the expended fluid flow after heat transfer in the heat exchanger HE 10. The relationship of a particular source temperature, $T_O$ 15, and the amplified temperature output, $T_5$ 42, is given by:

$$2T_5 = 3T_o - (T_2 + 2\Delta T_{JT})$$

where $\Delta T_2$ or $(T_o - T_2) > 2\Delta T_{JT}$ and $T_o \geq (T_2 + 2\Delta T_{JT})$

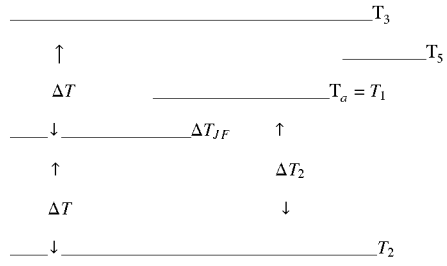

An energy balance for the amplifier yields:

$$h_1 = \frac{1}{2}h_2 + \frac{1}{2}h_3$$

and $$h_5 = \frac{1}{2}h_3 + \frac{1}{2}h_4$$

when $h_2 = h_3$ then $h_2 = h_4$ therefore when there is no reheat between $h_3$ and $h_4$ then there is no gain or amplification.

Figure 4:
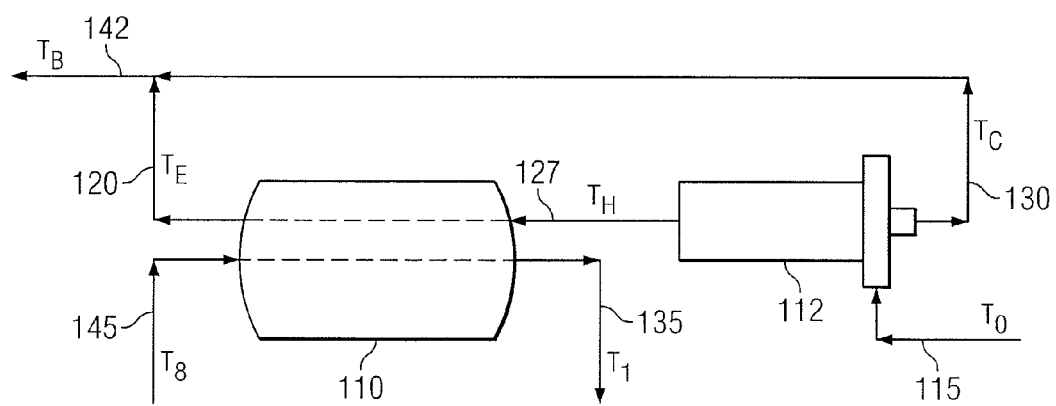
FIG. 4 is a schematic design and flow diagram of a counterflow vortex tube depicted segregating the input supercritical energy stream from a heat source into hot and cool streams, the hot stream is connected to a heat exchanger for hot duty.

Another embodiment of the present invention, which comprises a heat-exchanger and high-pressure large mass flow rate counterflow vortex tube, is shown in FIG. 4. In this embodiment a low-grade supply temperature fluid stream, $T_o$ 115, is provided to the vortex tube VT 112, where it is segregated into two fraction streams. Namely, the two streams are a hot fluid stream, $T_H$ 127, and cold fluid stream, $T_C$ 130. The hot fluid stream, $T_H$ 127, flows from the vortex tube body VT 112 to the high-pressure inlet of the heat-exchanger HE 110. The hot fluid stream, $T_H$ 127 provides heat to the heat exchanger HE 110, and emerges from the heat exchanger HE 110 at fluid stream $T_E$ 120. The expanded fluid stream $T_E$ 120 is combined or mixed with cold fluid stream $T_C$ 130, to produce the fluid stream, $T_B$ 142.

The temperature of the hot fluid stream, $T_H$ 127, and heat $h_H$ (enthalpy) of this fraction stream are significantly higher than the low-grade thermal supply temperature of fluid stream $T_o$ 115 and heat $h_o$ applied to that stream. The mass flow-rate from the heat source is adversely affected with the segregation of energy, but the advantage is the ability to use a low-grade heat source to generate power. The external energy transfer as heat within the heat-exchanger is used to evaporate the refrigerant fluid flow stream $T_8$ 145 in a Organic Rankine vapor power cycle, with $T_8$ 145 being the return fluid stream to the heat exchanger HE 110. By developing a higher supply temperature, $T_H = T_1$, by an external energy transfer, the vapor power cycle is enabled to produce power more efficiently than if the low-grade supply temperature, $T_1$, was directly used.

$$T_H = 2(T_O - \Delta J) + T_C$$

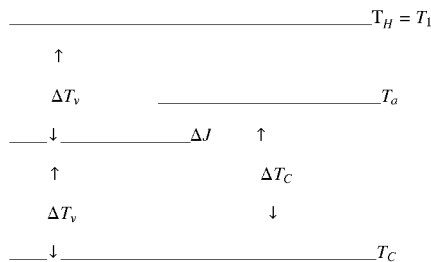

Figure 5:
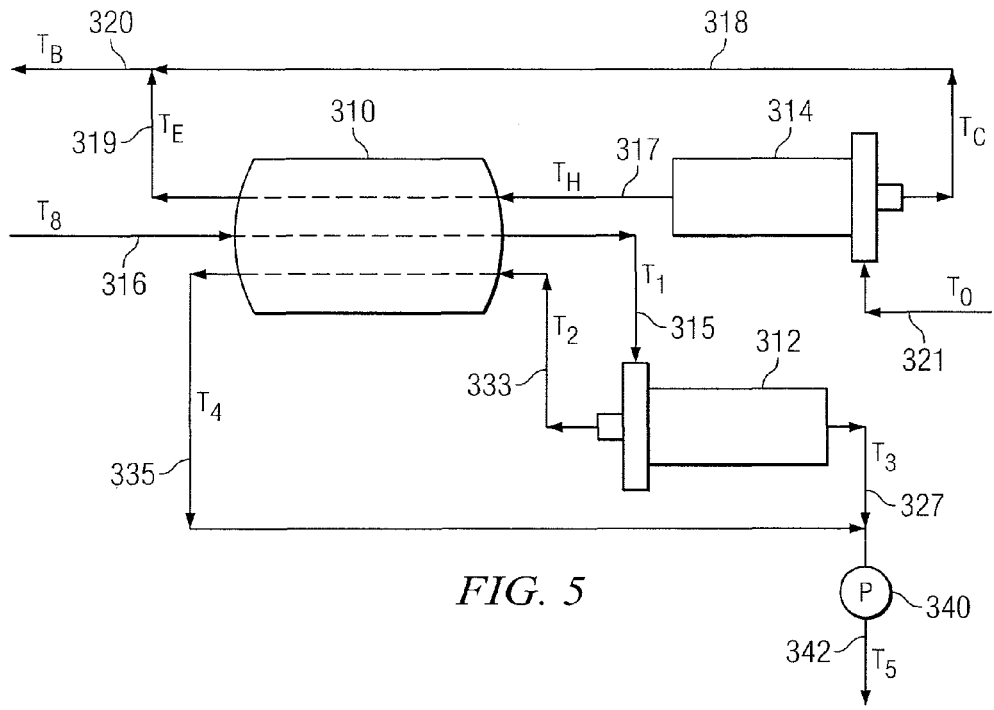
FIG. 5 is a schematic design and flow diagram of a first counterflow vortex tube depicted segregating the input supercritical energy stream from a heat source into hot and cool streams, the hot stream being connected to a heat exchanger transferring heat as input for second counterflow vortex tube, segregating the second input stream from heat-exchanger into hot and cool streams, preheating the cool stream and combining for a gain with the hot stream to form one stream.

Another embodiment of the present invention is shown in FIG. 5, which is comprised of a heat-exchanger HE 310 and two counterflow vortex tubes VT 312 and VT 314. The high flow-rate low-grade temperature vortex tube VT 314 segregates the supply fluid stream, $T_o$ 321, into a hot fluid stream, $T_H$ 317, and cool fluid stream, $T_C$ 318, fraction streams. The hot elevated temperature stream, $T_H$ 317, has significantly higher heat, $h_H$, (enthalpy) than the low-grade thermal supply, $T_C$ 321, and, $h_o$. The expanded fluid stream $T_E$ 319 is combined or mixed with cold fluid stream, $T_C$ 318 to produce the fluid stream, $T_B$ 320.

An external energy transfer as heat, $h_H$, from this elevated developed state within the heat-exchanger is used to evaporate the vapor power cycle refrigerant fluid stream, $T_8$ 316, found in a main cycle. The supply fluid stream $T_8$ 316 is provided to the heat exchanger HE 310, which super heats the stream into hot fluid stream $T_1$ 315. The effect is to increase the temperatures at which energy is added externally to the vapor power cycle, thereby increasing the energy-conversion efficiency. Particularly this embodiment, energy transfer, as heat, is similar to the operation found in a binary vapor cycle.

As shown in FIG. 5, the heat exchanger HE 310 receives a fluid flow $T_8$ 316 and heats the fluid into a supercritical vapor, $T_1$ 315. The vapor stream $T_1$ 315 is provided through tangential nozzle(s) to the vortex tube VT 312, which discharges a fraction of cool expanded vapor, $T_2$ 333, (also called the cool fraction) through a small hole in the diaphragm back to a return stream of heat exchanger HE 310. At the vortex tube VT 312, a fraction of intensely hot vapor, $T_3$ 327, created by the corollas force compression through the throttle valve in the vortex tube VT 312 is fed into stream $T_5$ 342, which may be circulated through a pump 340.

The cool fraction stream, $T_2$ 333, is routed to the first heat-exchanger HE 310 for reheating, and exits the heat exchanger HE 310 at an increased temperature at stream, $T_4$ 335, to the level of the first heat-exchanger source temperature $T_H$ 317. This stream $T_4$ 335 is combined and mixed with the intensely hot fraction, $T_3$ 327 (superheated flow) into $T_5$ 342. The effect is to thermally communicate with the source and increase the cool fraction temperature, $T_4$ 335, at which energy is added externally, thereby increasing the energy-conversion efficiency with a back flow stream through the heat exchanger HE 310.

The function of the counter-flow vortex tube in the present invention is to receive the evaporated heat-exchanger flow supply of supercritical vapor, $T_1$ 315, through tangential nozzle(s) and to discharge a fraction of cool expanded vapor, $T_2$ 333, through a small hole in the diaphragm, and a fraction of intensely hot vapor, $T_3$ 327, created by the corollas force compression through the throttle valve. It is important to note that vapor does not respond as an ideal gas; therefore, actual data should be used to predict performance of the vortex tube. By separating the hot and cool fractions causing a reduction in the pressure, the cool fraction, $T_2$ 333, is routed to the first heat-exchanger for reheating, to step up the cool fraction temperature, $T_4$ 335, to the level of the first heat-exchanger source temperature and combine with the intensely hot fraction, $T_3$ 327(superheated flow) both to be mixed, $T_5$ 342.

The reheated cool fraction and intensely hot vapor fraction mixture is routed to the power producing turbine-inlet thereby amplifying the enthalpy input from $h_1$ to $h_5$, extending and maintaining the enthalpy-spread from $h_5$ to $h_6$, and temperature of fluid stream, $T_5$ 342, across the power producing turbine yielding a greater power extraction. $T_H$ 317 is the source fluid flow provided to the heat exchanger HE 310, and $T_E$ 319 is the expended fluid flow after heat transfer in the heat exchanger HE 310.

The binary vapor cycle seems to be a good choice for processing the low-grade geothermal heat, $h_o$, for power generation. A binary vapor cycle, FIG. 5, typically employs two separate working fluids devising a higher-performance energy-conversion system. FIG. 5 has a great potential as a future application in the geothermal effort to develop the low-grade geothermal energy sources. The hot elevated temperature, $T_H$ 317, working fluid of the topping cycle is selected to have a reasonable vapor pressure at its normal operating conditions. It is possible that 317 will be a well fluid containing methane, $CO_2$, water, gas or oil, or $CO_2$ may be injected with other elements as it migrates through the engineered reservoirs.

A choice of $CO_2$ $T_B$ 320 as an elevated temperature, compressible fluid can achieve good thermal contact (wet) at commercial rates of heat production from the Texas lower-grade geothermal reservoirs (EGSs) for sustained periods of time. The main cycle typically employs a lower evaporation temperature refrigerant with reasonable vapor pressures at its normal operating condition. ASHRAE refrigerant designations: HFC-134a, R-125, R-410A, and R-407C (23/25/52) have been developed for this type application.

Figure 6:
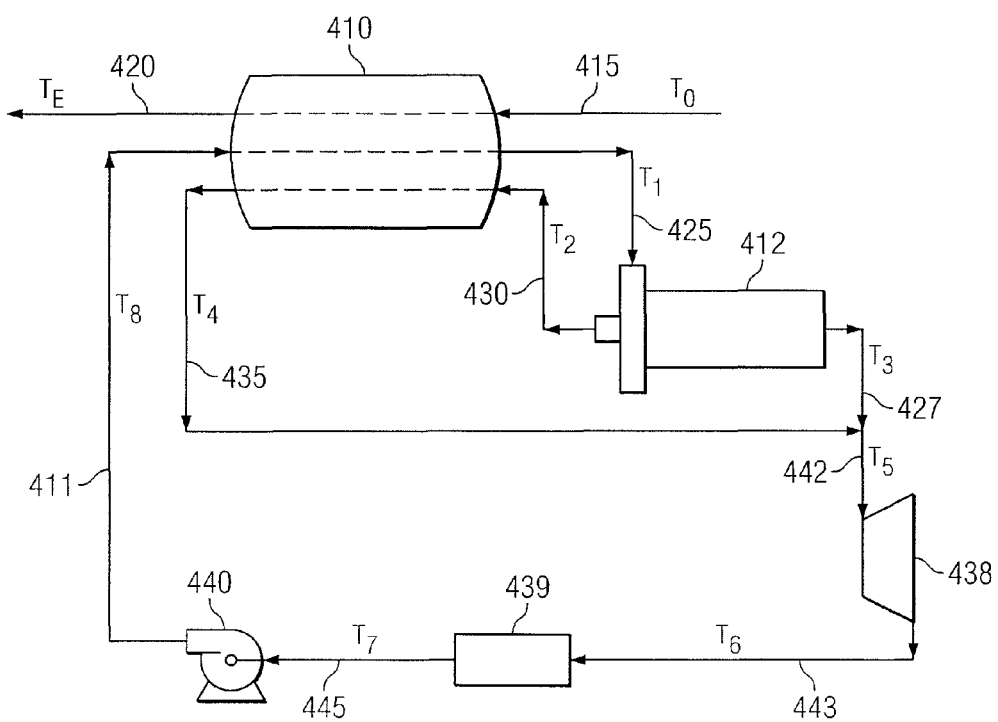
FIG. 6 is a schematic design and flow diagram depicting a Thermodynamic Amplifier intergraded into an Organic Rankine Cycle.

As shown in FIG. 6, the heat exchanger HE 410 receives a fluid flow $T_8$ 411 and heats the fluid into a supercritical vapor, $T_1$ 425. The vapor $T_1$ 425 is provided through tangential nozzle(s) to the vortex tube VT 412, which discharges a fraction of cool expanded vapor, $T_2$ 430, (also called the cool fraction) through a small hole in the diaphragm back to a return stream of heat exchanger HE 410. At the vortex tube VT 412, a fraction of intensely hot vapor, $T_3$ 427, created by the corollas force compression through the throttle valve in the vortex tube VT 412 is fed into stream $T_5$ 442.

The cool fraction stream, $T_2$ 430, is routed to the first heat-exchanger HE 410 for reheating, and exits the heat exchanger HE 410 at an increased temperature at stream, $T_4$ 435, to the level of the first heat-exchanger source temperature $T_o$ 415. This stream $T_4$ 435 is combined and mixed with the intensely hot fraction, $T_3$ 427, (superheated flow) into $T_5$ 442. The effect is to thermally communicate with the source and increase the cool fraction temperature, $T_4$ 435, at which energy is added externally, thereby increasing the energy-conversion efficiency with a back flow stream through the heat exchanger HE 410.

The combined stream $T_5$ 442 is fed into turbine 438 to produce electricity or convert the heat energy into a work, electrical or motive force. The temperature and pressure of combined stream $T_5$ 442 is lowered when it emerges from turbine 438 in feed stream $T_6$ 443, which is fed into a condenser 439. The condensed fluid stream $T_7$ 445 is transmitted from the condenser 439 at a lower temperature, and is fed into pump 440. Pump 440 transmits the fluid stream $T_8$ 411 back to the heat exchanger HE 410 to complete the cycle, and reheat the fluid stream into fluid stream $T_1$ 425 for transmission back to the vortex tube VT 412.

The function of the counter-flow vortex tube in the present invention is to receive the evaporated heat-exchanger flow supply of supercritical vapor, $T_1$ 425, through tangential nozzle(s) and to discharge a fraction of cool expanded vapor, $T_2$ 430, through a small hole in the diaphragm, and a fraction of intensely hot vapor, $T_3$ 427, created by the corollas force compression through the throttle valve. It is important to note that vapor does not respond as an ideal gas; therefore, actual data should be used to predict performance of the vortex tube. By separating the hot and cool fractions causing a reduction in the pressure, the cool fraction, $T_2$ 430, is routed to the first heat-exchanger for reheating, to step up the cool fraction temperature, $T_4$ 435, to the level of the first heat-exchanger source temperature and combine with the intensely hot fraction, $T_3$ 427 (superheated flow) both to be mixed, $T_5$ 442.

The reheated cool fraction and intensely hot vapor fraction mixture is routed to the power producing turbine-inlet thereby amplifying the enthalpy input from $h_1$ to $h_5$, extending and maintaining the enthalpy-spread from $h_5$ to $h_6$, and temperature, $T_5$, across the power producing turbine yielding a greater power extraction. $T_O$ 415 is the source fluid flow provided to the heat exchanger HE 410, and $T_E$ 420 is the expended fluid flow after heat transfer in the heat exchanger HE 410. The relationship of a particular source temperature, $T_o$ 415, and the amplified temperature output, $T_5$ 442, is given by:

$$1 T_5 = 3 T_o - (T_2 + 2\Delta T_{JT})$$

where $\Delta T_2$ or $(T_o - T_2) > 2\Delta T_{JT}$ and $T_o \geq (T_2 + 2\Delta T_{JT})$. $\Delta T_{JT}$ can be determined given the desired pressure drop and beginning state. This is the same temperature drop as shown in throttling through a valve.

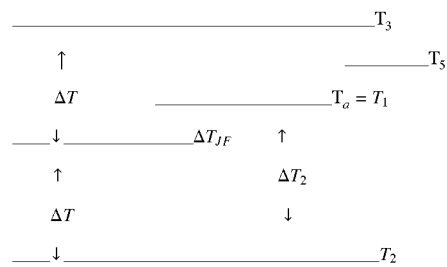

An energy balance for the amplifier yields:

$$h_1 = \frac{1}{2}h_2 + \frac{1}{2}h_3$$

and $$h_5 = \frac{1}{2}h_3 + \frac{1}{2}h_4$$

when $h_1 = h_5$ then $h_2 = h_4$ therefore when there is no reheat between $h_2$ and $h_1$ then there is no gain or amplification.

Figure 7:
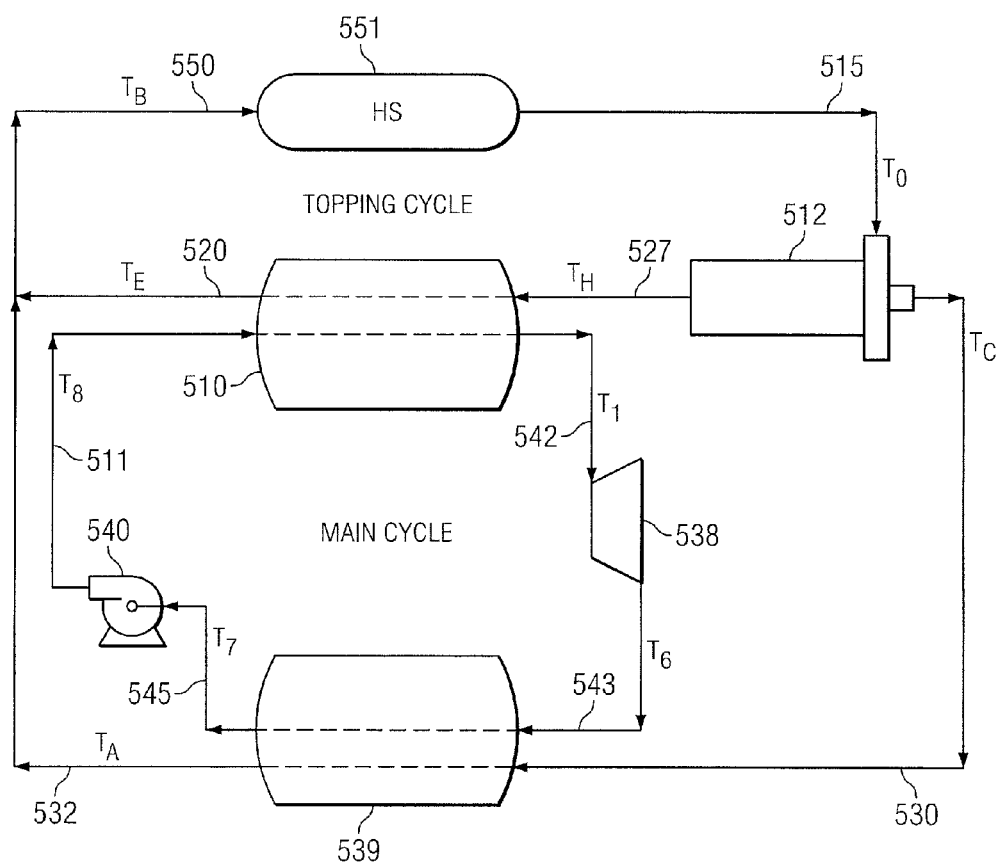
FIG. 7 is a schematic design and flow diagram depicting a binary vapor cycle, the Thermodynamic Amplifier integrated into the topping cycle for hot and cold service, the main cycle in thermal communication with topping cycle for evaporation and condensing.

The invention's preferred incorporation is as part of a vapor power cycle. An embodiment of this preference is shown in FIG. 7 as a main cycle of a binary vapor cycle. The binary vapor cycle seems to be a good choice for processing the low-grade geothermal heat, $h_o$ for power generation. A binary vapor cycle, FIG. 7, typically employs two separate working fluids devising a higher-performance energy-conversion system. FIG. 7 has a great potential as a future application in the geothermal effort to develop the low-grade geothermal energy sources. The hot elevated temperature, $T_H$, working fluid of the topping cycle should have a reasonable vapor pressure at its normal operating conditions. This is well fluid, however, which can be a mixture of water, $CO_2$, methane, gas or oil. A choice of $CO_2$ as a compressible fluid at an elevated temperature can achieve good thermal contact (wet) at commercial rates of heat production from the Texas lower-grade geothermal reservoirs (EGSs) for sustained periods of time. The main cycle typically employs a lower evaporator temperature refrigerant with reasonable vapor pressures at its normal operating condition. ASHRAE refrigerant designations: HFC-134a, R-125, R-410A, and R-407C (23/25/52) have been developed for this type application.

Another embodiment of the present invention, which comprises a heat-exchanger and high-pressure large mass flow rate counterflow vortex tube, is shown in FIG. 7. In this embodiment a low-grade supply temperature fluid stream, $T_o$ 515, is provided to the vortex tube VT 512, where it is segregated into two fraction streams. Namely, the two streams are a hot fluid stream, $T_H$ 527, and cold fluid stream, $T_C$ 530. The hot fluid stream, $T_H$ 527, flows from the vortex tube body VT 512 to the high-pressure inlet of the heat-exchanger HE 510 to heat the fluid flow $T_8$ 511 entering the heat exchanger HE 510. The expanded fluid stream $T_E$ 520 emerges from the heat exchanger HE 510 and is combined or mixed with fluid stream $T_A$ 532 emerging from the heat exchanger HE 539. The combined fluid streams $T_A$ 532 and $T_E$ 520 form fluid stream $T_B$ 550 that is provided to heat source HS 551 for the addition of heat and pressure. After heated in heat source HS 551, the fluid stream $T_O$ 515 is fed back into the vortex tube VT 512 for separation into a hot fluid stream $T_H$ 527 and a cold fluid stream $T_C$ 530 to complete the upper cycle.

The cold fluid stream, $T_C$ 530, is provided to a heat exchanger HE 539, and emerges from the heat exchanger HE 539 at fluid stream $T_A$ 532. The heat exchangers HE 539 and HE 510 operate with the main cycle. In the main cycle, the stream $T_1$ 542 is fed into turbine 538 to produce electricity or convert the heat energy into a work, electrical or motive force. The temperature and pressure of combined stream $T_1$ 542 is lowered when it emerges from turbine 538 in feed stream $T_6$ 543, which is fed into a heat exchanger HE 539. The fluid stream $T_7$ 545 is transmitted from the heat exchanger HE 539 at a lower temperature, and is fed into pump 540. Pump 540 transmits the fluid stream $T_8$ 511 back to the heat exchanger HE 510 to complete the main cycle, and reheat the fluid stream into fluid stream $T_1$ 542 for transmission back to the turbine 538. This completes the main cycle for the system.

The temperature of the hot fluid stream, $T_H$ 527, and heat $h_H$ (enthalpy) of this hot fraction stream are significantly higher than the low-grade thermal supply temperature of fluid stream $T_o$ 515 and heat $h_o$ applied to that stream. The mass flow-rate from the heat source is adversely affected with the segregation of energy, but the advantage is the ability to use a low-grade heat source to generate power. The external energy transfer as heat within the heat-exchanger is used to evaporate the refrigerant fluid flow stream $T_8$ 511 in a Organic Rankine vapor power cycle, with $T_8$ 511 being the return fluid stream to the heat exchanger HE 510. By developing a higher supply temperature, $T_H=T_1$, by an external energy transfer, the vapor power cycle is enabled to produce power more efficiently than if the low-grade supply temperature, $T_1$, was directly used.

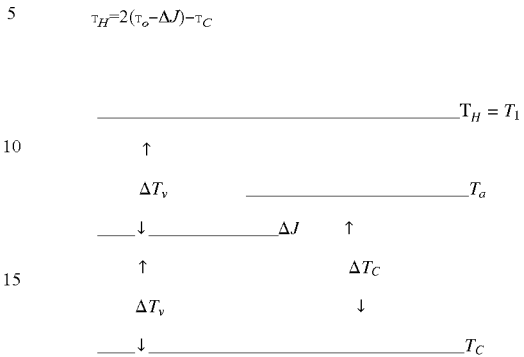

In a closed Binary Vapor Cycle (see FIG. 8 main cycle), the main cycle shown above is combined with an additional vortex tube, which is used in combination with the topping cycle for evaporation and condensing. The main cycle uses the vortex tube to intensify the supply heat to excite the power producing turbine, but does not split the mass flow to the turbine. The topping cycle, on the other hand, splits the mass flow from the heat source. The external energy transferred as heat, $h_H$, from the high-pressure topping cycle evaporates the ORC refrigerant, $T_8$, in the heat-exchanger. The function of the counterflow vortex tube is to receive the evaporated heat-exchanger flow of supercritical vapor, $T_1$, through tangential nozzles and to discharge a stream of cool expanded vapor, $T_2$, and a stream of intensely hot vapor, $T_3$.

Figure 8:
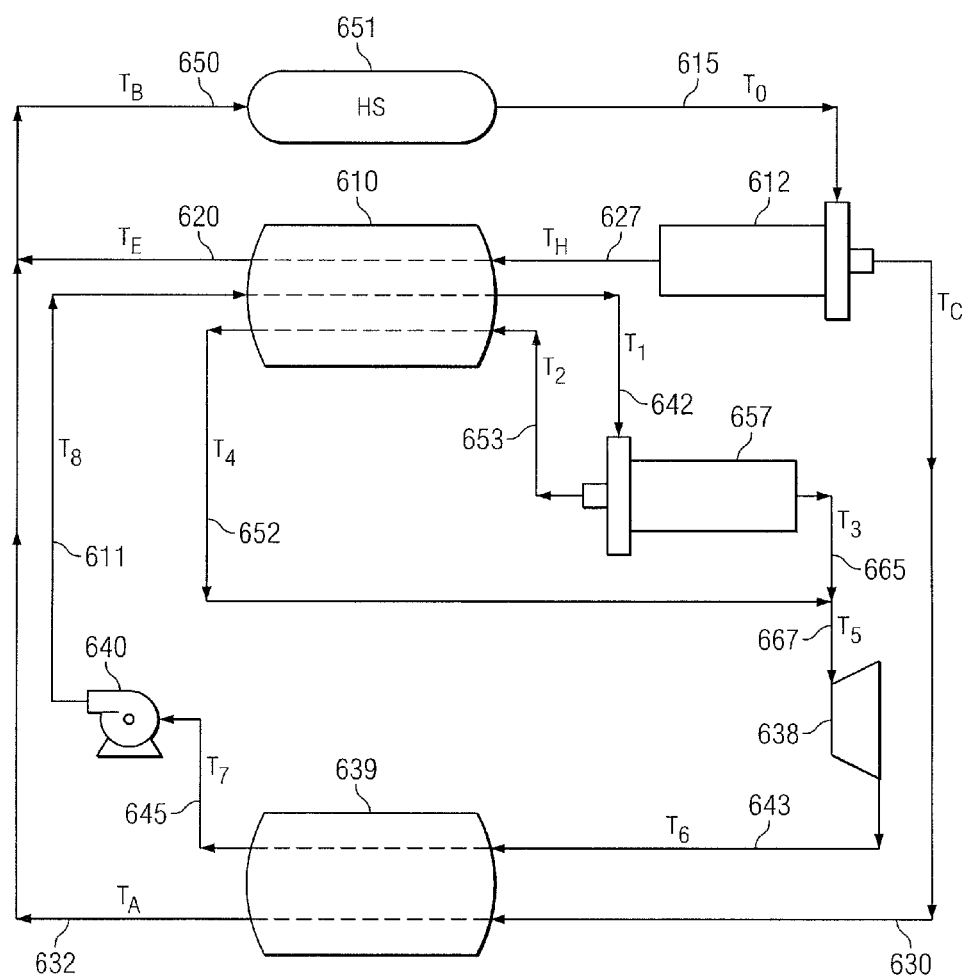
FIG. 8 is a schematic design and flow diagram that depicts a binary vapor cycle, the Thermodynamic Amplifier integrated into the topping and main cycles for hot and cold service, the main cycle in thermal communication with topping cycle for evaporation and condensing.

In FIG. 8 of the present invention, a heat-exchanger and two high-pressure large mass flow rate counterflow vortex tube are used. In this embodiment a low-grade supply temperature fluid stream, $T_o$ 615, is provided to the vortex tube VT 612, where it is segregated into two fraction streams. Namely, the two streams are a hot fluid stream, $T_H$ 627, and cold fluid stream, $T_C$ 630. The hot fluid stream, $T_H$ 627, flows from the vortex tube body VT 612 to the high-pressure inlet of the heat-exchanger HE 610 to heat and evaporate the fluid flow $T_8$ 611 entering the heat exchanger HE 610. The expanded fluid stream $T_E$ 620 emerges from the heat exchanger HE 610 and is combined or mixed with fluid stream $T_A$ 632 emerging from the heat exchanger HE 639.

The combined fluid streams $T_A$ 632 and $T_E$ 620 form fluid stream $T_B$ 650 that is provided to heat source HS 651 for the addition of heat and pressure. After heated in heat source HS 651, the fluid stream $T_O$ 615 is fed back into the vortex tube VT 612 for separation into a hot fluid stream $T_H$ 627 and a cold fluid stream $T_C$ 630 to complete the upper cycle.

The cold fluid stream, $T_C$ 630, is provided to a heat exchanger HE 639, and emerges from the heat exchanger HE 639 at fluid stream $T_A$ 632. The heat exchangers HE 639 and HE 610 operate with the main cycle. In the main cycle, the stream $T_1$ 642 is provided through tangential nozzle(s) to the vortex tube VT 657, which discharges a fraction of cool expanded vapor, $T_2$ 653, (also called the cool fraction) through a small hole in the diaphragm back to a return stream of heat exchanger HE 610. At the vortex tube VT 657, a fraction of intensely hot vapor, $T_3$ 665, created by the corollas force compression through the throttle valve in the vortex tube VT 657 is fed into stream $T_5$ 667, which is provided to the turbine 638.

The cool fraction stream, $T_2$ 653, is routed to the first heat-exchanger HE 610 for reheating, and exits the heat exchanger HE 610 at an increased temperature at stream, $T_4$ 652, to the level of the first heat-exchanger source temperature. This stream $T_4$ 652 is combined and mixed with the intensely hot fraction, $T_3$ 665, (superheated flow) into $T_5$ 667. The effect is to thermally communicate with the source and increase the cool fraction temperature, $T_4$ 652, at which energy is added externally, thereby increasing the energy-conversion efficiency with a back flow stream through the heat exchanger HE 610.

The function of the counter-flow vortex tube VT 657 in the present invention is to receive the evaporated heat-exchanger flow supply of supercritical vapor, $T_1$ 542, through tangential nozzle(s) and to discharge a fraction of cool expanded vapor, $T_2$ 653, through a small hole in the diaphragm, and a fraction of intensely hot vapor, $T_3$ 665, created by the corollas force compression through the throttle valve. It is important to note that vapor does not respond as an ideal gas; therefore, actual data should be used to predict performance of the vortex tube. By separating the hot and cool fractions causing a reduction in the pressure, the cool fraction, $T_2$ 653, is routed to the first heat-exchanger HE 610 for reheating, to step up the cool fraction temperature, $T_4$ 652, to the level of the first heat-exchanger source temperature and combine with the intensely hot fraction, $T_3$ 665 (superheated flow) both to be mixed into fluid stream $T_5$ 667.

Fluid stream $T_5$ 667 is fed into turbine 638 to produce electricity or convert the heat energy into a work, electrical or motive force. The temperature and pressure of combined stream $T_5$ 667 is lowered when it emerges from turbine 638 in feed stream $T_6$ 643, which is fed into a heat exchanger HE 639. The fluid stream $T_7$ 645 is transmitted from the heat exchanger HE 639 at a lower temperature, and is fed into pump 640. Pump 640 transmits the fluid stream $T_8$ 611 back to the heat exchanger HE 610 to complete the main cycle, and reheat the fluid stream into fluid stream $T_1$ 642 for transmission back to the vortex tube 657. This completes the main cycle for the system.

By separating the hot and cool streams causing a reduction in the pressure, the cool stream, $T_2$, is routed to the heat-exchanger for preheating, to step up the cool stream temperature, $T_4$, to the level of the heat-exchanger outlet temperature and combine with the intensely hot stream, $T_3$, (superheated flow) both to be mixed, $T_5$, and routed to the turbine-inlet thereby amplifying the enthalpy, $h_5$, increasing the enthalpy-spread, $k_5$ to $k_6$, and temperature, $T_5$ to $T_6$, across the power producing turbine, yielding an efficient greater power output, $\Delta h$. Theoretically, the condenser temperature could be lower until the working fluid approaches its solid state, but removing heat at very low temperatures is not practical.

Therefore, the turbine-outlet/condenser-inlet temperature, $T_6$, is as low as the temperature of the surrounding atmosphere to allow the ambient air cooled removal of the latent heat to attain a saturated liquid state, $T_7$, to enable pumping. In this embodiment the removal of heat, $h_6$, in the condenser is by the external transfer of heat to the cool, $T_C$, fraction. This would negate the adverse atmospheric affects and would mean that a larger enthalpy change, $T_C$, across the turbine could be achieved. This energy extraction will permit the operation with a larger turbine enthalpy change, $\Delta h$, resulting in an increased power production from the turbine. After examination, the relationship of a particular input temperature, $T_o$, and the amplified output temperature, $T_5$, is shown below.

$$T_5 = 3T_a - \left\{ \frac{(3T_C + T_2)}{2} + (3\Delta J + \Delta T_{JT}) \right\}$$

Solar energy is transmitted from the sun in the form of electromagnetic radiation. Although the earth receives about ½ of one billionth of the total solar energy output, this amounts to about 420 trillion Kilowatt-hours annually. The earth's atmosphere reduces this amount through absorption by water vapor and the action of suspended solid particles. Many attempts in regions of high temperature and clear air have been made to use this radiation for power generation. The principle of utilizing this radiation for power has been to use a central receiver focusing collector (boiler) and employing a concave mirror(s) turned by a motor to follow the sun as the earth moves in order to maintain a focus on the sun. Steam was formed in the collector at about 35 psia and then transferred to the power producing turbine for extracting power, but this thermal engine was not economically feasible.

Distributed solar collector installations are the current solar power thermal conversion systems. The basic concept underlying a distributed solar collector power generation installation is to capture and utilize solar radiation to heat a working fluid to a temperature high enough to be used (either directly or indirectly) to power a turbine which will, in turn, drive an electric power generator and thus produce electricity. Both of these methods attain the requisite temperatures in working fluid quantities large enough for power generation.

The present invention may be employed as a solar power thermal conversion system. FIG. 6 depicts an illustrative embodiment of the present invention that may be employed to recover heat where the first heat exchanger is a solar collector used to gather and accumulate the sun's energy or solar radiation. The working fluid is evaporated isothermally within the solar collector yielding a supercritical vapor at a lower temperature and higher pressure that exceeds well-known ORC pressures. Because of the smaller difference between the operating temperature of the solar collector and the condensing temperature, the present invention may be employed to set the operating pressure very high to excite a vortex tube to produce a higher temperature working fluid at a well-known ORC pressure.

Solar power thermal conversion systems involve an extensive array of steel pipes (the solar collector) coated with materials heated by the sun's rays. In one concept, R-410A flowing through the pipes would gather the heat and transport it to a vortex tube. The high pressure R-410A may attain a minimum temperature of 160.44° F. in the solar collector, which could develop an evaporated fluid that could power conventional turbines at an economically feasible projected thermal efficiency of about 21%. The warm vapor from the solar collector enters the vortex tube as a high pressure vapor of 1,400 psia, at the minimum temperature of approximately 160.44° F. and emerges at an intermediate pressure of 682 psia segregated by the vortex tube forming hot and cool fractions where the hot temperature, 198° F., is above 160.44° F. and the cool fraction temperature of 100° F. below. The cool fraction working fluid is re-heated to 160.44° F. and mixed with the hot fraction yielding a re-combined flow of 174.4° F. at 682 psia. The combined flow enters the power producing turbine and exits the turbine as exhaust at less temperature and pressure. The exhaust is provided to a condenser for chilling and the removal of the latent heat. This subcooled liquid exiting the condenser is supplied directly to the pump and is pumped to a high pressure of 1,400 psia, as subcooled liquid working fluid. The various components depicted in FIG. 6, e.g., pumps, turbines, condensers, etc., may be similar to those described above wherein such equipment is properly sized and configured to operate in the system depicted in FIG. 6.

In summary, the present invention establishes novel methods to increase the effective temperature and total energy requirements to achieve power production from a lower-grade temperature source as well as lower the main cycle condensing temperature. While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

I claim:

1. A process for generating motive work, comprising the steps of:
   heating a first fluid stream in a first heat exchanger, said first heat exchanger producing a second fluid stream that has a higher temperature than the first fluid stream, said first heat exchanger receiving heat from a first external heat source,
   providing said second fluid stream to a vortex tube where the second fluid stream is segregated into a hot second fluid stream and a cool second fluid stream,
   providing said cool second fluid stream to the first heat exchanger, said first heat exchanger producing a third fluid steam that has a higher temperature than the cool second fluid stream,
   combining the third fluid stream with the hot second fluid stream into a fourth fluid stream,
   providing the fourth fluid stream to a turbine to produce a motive work force.

2. The process of claim 1 wherein the second or fourth fluid stream is a supercritical vapor.

3. The process of claim 1 further comprising the steps of:
   providing a fifth fluid stream from the turbine to a condenser where the fifth fluid stream temperature is decreased.

4. The process of claim 1 further comprising the steps of:
   pumping a fifth fluid stream from the turbine to the first heat exchanger with a pump unit to provide the first fluid stream to the first heat exchanger.

5. The process of claim 1 wherein the motive work produced by the process is used in the production of electricity.

6. The process of claim 1 wherein the turbine is a thermodynamic engine that converts the elevated temperature of the fourth fluid stream into a non-heat form of energy.

7. The process of claim 1 wherein the heat source includes a hydrocarbon combustion heat source.

8. The process of claim 1 wherein the heat source includes a low grade heat recovered geothermal energy.

9. A system for generating electricity, comprising:
   a first heat exchanger that heats a first fluid stream, said first heat exchanger produces a second fluid stream that has a higher temperature than the first fluid stream, said first heat exchanger receiving heat from a first external heat source,
   a vortex tube that receives said second fluid stream and segregates the second fluid stream into a hot second fluid stream and a cool second fluid stream, said cool second fluid stream being provided to the first heat exchanger where the first heat exchanger increases the temperature of the cool second fluid stream to produce a third fluid steam,
   a turbine that receives a fourth fluid stream, said fourth fluid stream is derived from the third fluid stream and hot second fluid stream, is used to produce a motive work force for the generation of electricity.

10. The system of claim 9 wherein the second or fourth fluid stream is a supercritical vapor.

11. The system of claim 9 further comprising:
    a fifth fluid stream provided from the turbine to a condenser where the fifth fluid stream temperature is decreased.

12. The system of claim 11 wherein the fifth fluid stream is provided to the first heat exchanger with a pump unit to provide the first fluid stream to the first heat exchanger.

13. The system of claim 9 wherein the motive work produced by the turbine is used in the production of electricity.

14. The system of claim 9 wherein the turbine is a thermodynamic engine that converts the elevated temperature of the fourth fluid stream into a non-heat form of energy.

15. The system of claim 9 wherein the heat source includes a hydrocarbon combustion heat source.

16. The system of claim 9 wherein the heat source includes a low grade heat recovered from geothermal energy.

17. A process for generating motive work, comprising the steps of:
    providing a first heated fluid stream to a vortex tube where the first heated fluid stream is segregated into a hot first fluid stream and a cool first fluid stream, said first heated fluid stream receiving heat from a first external heat source;
    transferring the hot first fluid stream to a first heat exchanger to provide heating, said hot first fluid stream being applied to said first heat exchanger after segregation of the first heated fluid stream into the hot first fluid stream and cool first fluid stream by the vortex tube;
    providing a second fluid stream to said first heat exchanger, said first heat exchanger producing a third fluid stream derived from the second fluid stream that has a higher temperature than the second fluid stream and said first heat exchanger receiving heat from the hot first fluid stream derived from the vortex tube,
    providing the third fluid stream to a turbine to produce a motive work force,
    providing exhaust from the turbine as a fifth fluid stream,
    transferring said fifth fluid stream to a second heat exchanger, said second heat exchanger producing said second fluid stream that has a lower temperature than the fifth fluid stream and is transferred to the first heat exchanger, said second heat exchanger also receiving said cool first fluid stream and producing a sixth fluid stream derived from said cool first fluid stream,
    producing at said first heat exchanger a fourth fluid stream derived from said hot first fluid stream that is combined with said sixth fluid stream for a transfer to the first external heat source.

18. The process of claim 17 wherein the first heated fluid stream is a compressible fluid or the third fluid stream is a supercritical vapor.

19. The process of claim 17 wherein the motive work produced by the turbine is used in the production of electricity.

20. The process of claim 17 wherein the turbine is a thermodynamic engine that converts the elevated temperature of the third fluid stream into a non-heat form of energy.

21. The process of claim 17 wherein the heat source includes a hydrocarbon combustion heat source.

22. The process of claim 17 wherein the heat source includes low grade heat recovered from geothermal energy.

23. A system for generating electricity, comprising:
a vortex tube that receives a first heated fluid stream, the first heated fluid stream being segregated in the vortex tube into a hot first fluid stream and a cool first fluid stream, said first heated fluid stream receiving heat from a first external heat source;
a first heat exchanger that heats a second fluid stream and produces a third fluid stream with a higher temperature than the second fluid stream, said first heat exchanger receiving heat from the hot first fluid stream received from the vortex tube and said first heat exchanger producing a fourth fluid stream derived from said hot first fluid stream,
a turbine that receives said third fluid stream to produce a motive work force, said turbine producing a fifth fluid stream derived from the turbine exhaust,
a second heat exchanger that heats said cool first fluid stream and produces a sixth fluid stream derived from said cool first fluid stream, said second heat exchanger receiving heat from said fifth fluid stream and said second heat exchanger producing the second fluid stream from said fifth fluid stream that is transferred to the first heat exchanger,
combining said fourth fluid stream with said sixth fluid stream for transfer to the first external heat source.

24. The system of claim 23 wherein the first heated fluid stream is a compressible fluid or the third fluid stream is a supercritical vapor.

25. The system of claim 23 wherein the motive work produced by the turbine is used in the production of electricity.

26. The system of claim 23 wherein the turbine is a thermodynamic engine that converts the elevated temperature third fluid stream into a non-heat form of energy.

27. The system of claim 23 wherein the heat source includes a hydrocarbon combustion heat source.

28. A process for generating motive work, comprising the steps of:
providing a first heated fluid stream to a first vortex tube where the first heated fluid stream is segregated into a hot first fluid stream and a cool first fluid stream, said first heated fluid stream receives heat from a first external heat source;
heating a second fluid stream in a first heat exchanger,
producing a third fluid stream at said first heat exchanger that has a higher temperature than the second fluid stream;
receiving heat at said first heat exchanger from the hot first fluid stream as received from the first vortex tube,
producing at said first heat exchanger a fourth fluid stream derived from said hot first fluid stream,
transferring said fourth fluid stream to the first external heat source for re-heating;
providing the third fluid stream to a second vortex tube where the third fluid stream is segregated into a hot third fluid stream and a cool third fluid stream,
providing said cool third fluid stream to the first heat exchanger where the first heat exchanger increases the temperature of the cool third fluid stream to produce a fifth fluid steam,
mixing the fifth fluid stream with the hot third fluid stream to form a sixth fluid stream,
providing the sixth fluid stream to a turbine to produce a motive work force.

29. The process of claim 28 wherein the first heated fluid stream and the third fluid stream are compressible fluids, and the sixth fluid stream is a supercritical vapor.

30. The process of claim 28 wherein the motive work produced by the turbine is used in the production of electricity.

31. The process of claim 28 wherein the turbine is a thermodynamic engine that converts the elevated temperature sixth fluid stream into a non-heat form of energy.

32. The process of claim 28 wherein the heat source includes a hydrocarbon combustion heat source.

33. A system for generating electricity, comprising:
a first vortex tube that receives a first heated fluid stream, the first heated fluid stream is segregated into a hot first fluid stream and a cool first fluid stream, and said first heated fluid stream receives heat from a first external heat source,
a first heat exchanger that receives a second fluid stream, said first heat exchanger producing a third fluid stream that has a higher temperature than the second fluid stream, said first heat exchanger receiving heat from the hot first fluid stream transferred to said first heat exchanger from the first vortex tube, said first heat exchanger produces a fourth fluid stream derived from said hot first fluid stream that is transferred to the first external heat source for re-heating;
a second vortex tube that receives a third fluid stream, the third fluid stream being segregated into a hot third fluid stream and a cool third fluid stream, said cool third fluid stream being provided to the first heat exchanger where the first heat exchanger increases the temperature of the cool third fluid stream to produce a fifth fluid steam,
a turbine that receives said fifth fluid stream to produce a motive work force.

34. The system of claim 33 wherein the hot first fluid stream or the third fluid stream is a supercritical vapor.

35. The system of claim 33 wherein the motive work is used in the production of electricity.

36. The system of claim 33 wherein the turbine is a thermodynamic engine that converts the elevated temperature fourth fluid stream into a non-heat form of energy.

37. The system of claim 33 wherein the heat source includes a hydrocarbon combustion heat source.

38. The process of claim 17 further comprising the steps of:
providing a pump to the second fluid stream that transfers the second fluid stream to the first heat exchanger.

39. The process of claim 17 wherein the turbine produces work using heat from the third fluid stream.

40. The process of claim 17 wherein the first and second heat exchangers are double flow heat exchangers.

41. The process of claim 17 wherein the first heat exchanger is a cross-flow or plate and shell heat exchanger.

42. The system of claim 23 further comprising a pump provided to the second fluid stream to transfer the second fluid stream to the first heat exchanger.

43. The system of claim 23 wherein the turbine produces work using heat from the third fluid stream.

44. The system of claim 23 wherein the first and second heat exchangers are double flow heat exchangers.

45. The system of claim 23 wherein the first heat exchanger is a cross-flow or plate and shell heat exchanger.

* * * * *